(12) United States Patent
Sicola et al.

(10) Patent No.: US 6,356,979 B1
(45) Date of Patent: Mar. 12, 2002

(54) SYSTEM AND METHOD FOR SELECTIVELY PRESENTING LOGICAL STORAGE UNITS TO MULTIPLE HOST OPERATING SYSTEMS IN A NETWORKED COMPUTING SYSTEM

(75) Inventors: Stephen J. Sicola, Monument; Michael D. Walker; James E. Pherson, both of Colorado Springs, all of CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/312,944

(22) Filed: May 17, 1999

(51) Int. Cl.[7] ............................................... G06F 12/00
(52) U.S. Cl. ........................................ 711/114; 711/163
(58) Field of Search ............................. 711/114, 4, 151, 711/152, 163

(56) References Cited

U.S. PATENT DOCUMENTS

| | | | | |
|---|---|---|---|---|
| 5,440,716 A | * | 8/1995 | Schultz et al. | 395/441 |
| 5,568,629 A | * | 10/1996 | Gentry et al. | 395/441 |
| 6,145,028 A | * | 11/2000 | Shank et al. | 710/31 |
| 6,260,120 B1 | * | 7/2001 | Blumenau et al. | 711/152 |

* cited by examiner

*Primary Examiner*—Matthew Kim
*Assistant Examiner*—Christian P. Chace
(74) *Attorney, Agent, or Firm*—William J. Kubida; Stuart T. Langley; Hogan & Hartson LLP

(57) ABSTRACT

A storage system capable of selectively presenting logical units to one or more host computing systems. The storage system comprises one or more persistent storage devices arranged as logical units; an array controller controlling and coordinating the operations of the persistent storage devices; a memory accessible by the array controller; and a configuration table stored in the memory, the configuration table containing one or more entries governing the interactions between the logical units and the one or more host computing systems. The configuration table contains an entry for each logical unit which the array controller accesses to determine if a particular logical unit should communicate with a particular one of the host computing systems, an entry for each logical unit which the array controller accesses to determine if a particular logical unit should communicate with a particular one of the host computing systems using an internal offset for a logical unit number, and an entry for each logical unit which the array controller accesses to determine if a particular logical unit should communicate with a particular one of the host computing systems using a predetermined host mode.

17 Claims, 20 Drawing Sheets

D0                                  R1
    LUN ID:     6000-1FE1-0000-0240-0001-8290-1907-0072
    NOIDENTIFIER
    SWITCHES:
        RUN                         NOWRITE_PROTECT         READ_CACHE
        READAHEAD_CACHE             NOWRITEBACK_CACHE
        MAXIMUM_CACHED_TRANSFER_SIZE = 32
44  ACCESS:
        HOSTA1P1, HOSTA2P1
    STATE:
        ONLINE TO THIS CONTROLLER
        NOT RESERVED
        PREFERRED_PATH = THIS_CONTROLLER
    SIZE: 16751956 BLOCKS
    GEOMETRY: (C/H/S): ( 7413 / 20 / 113 )

D1                                  S1
    LUN ID:     6000-1FE1-0000-0240-0001-8290-1907-007D
    NOIDENTIFIER
    SWITCHES:
        RUN                         NOWRITE_PROTECT         READ_CACHE
        NOREADAHEAD_CACHE           WRITEBACK_CACHE
        MAXIMUM_CACHED_TRANSFER_SIZE = 32
44  ACCESS:
        HOSTA1P1, HOSTA2P1
    STATE:
        ONLINE TO THE OTHER CONTROLLER
        PREFERRED_PATH = OTHER_CONTROLLER
    SIZE: 53307531 BLOCKS
    GEOMETRY: (C/H/S): ( 15772 / 20 / 169 )

D2                                  S2
    LUN ID:     6000-1FE1-0000-0240-0001-8290-1907-0080
    NOIDENTIFIER
    SWITCHES:
        RUN                         NOWRITE_PROTECT         READ_CACHE
        READAHEAD_CACHE             WRITEBACK_CACHE
        MAXIMUM_CACHED_TRANSFER_SIZE = 32
44  ACCESS:
        HOSTA1P1, HOSTA2P1
    STATE:
        ONLINE TO THIS CONTROLLER
        NOT RESERVED
        PREFERRED_PATH = THIS_CONTROLLER
    SIZE: 35538354 BLOCKS
    GEOMETRY: (C/H/S): ( 10515 / 20 / 169 )

D3                                  DISK10200
    LUN ID:     6000-1FE1-0000-0240-0001-8290-1907-0087
    NOIDENTIFIER
    SWITCHES:
        RUN                         NOWRITE_PROTECT         READ_CACHE
        NOREADAHEAD_CACHE           NOWRITEBACK_CACHE
        MAXIMUM_CACHED_TRANSFER_SIZE = 32
44  ACCESS:
        HOSTA1P1, HOSTA2P1
    STATE:
        ONLINE TO THE OTHER CONTROLLER
        PREFERRED_PATH = OTHER_CONTROLLER
    SIZE: 17769177 BLOCKS
    GEOMETRY: (C/H/S): ( 5258 / 20 / 169 )

*Fig. 2*

CONTROLLER CONFIGURATION SETUP :
CONTROLLER A IN MULTIBUS FAILOVER WITH CONTROLLER B
BOTH CONTROLLERS' PORT_1_TOPOLOGY = LOOP_HARD
BOTH CONTROLLERS' PORT_2_TOPOLOGY = LOOP_HARD
CONTROLLER A PORT_1_AL_PA = CONTROLLER B PORT_1_AL_PA
CONTROLLER A PORT_2_AL_PA = CONTROLLER B PORT_2_AL_PA
HOST A OFFSET = 0
HOST B OFFSET = 0
D0-D7 ACCESS ID= HOSTA1P1, HOSTA2P1, HOSTB1P2, HOSTB2P2
D0-D7 PREFER_PATH = THIS OR OTHER_CONTROLLER

| HOST CONNECTIONS : | | | | |
|---|---|---|---|---|
| NAME | PORT | CONTROLLER | OFFSET | HOST MODE |
| HOSTA1P1 | 1 | THIS | 0 | NT |
| HOSTA1P2 | 2 | THIS | 0 | NT |
| HOSTA2P1 | 1 | OTHER | 0 | NT |
| HOSTA2P2 | 2 | OTHER | 0 | NT |
| HOSTB1P1 | 1 | THIS | 0 | VMS |
| HOSTB1P2 | 2 | THIS | 0 | VMS |
| HOSTB2P1 | 1 | OTHER | 0 | VMS |
| HOSTB2P2 | 2 | OTHER | 0 | VMS |

DEFINITIONS :
NA - NOT ACCESSIBLE
CLUSTERED HOSTS - ALL LUNS ARE SHARED BETWEEN HOSTS

CONNECTION NAMES HAVE THE FOLLOWING CONVENTION:
[HOST NAME] [ADAPTER NUMBER] P[PORT NUMBER]

*Fig. 4B*

CONFIGURATION SETUP :
CONTROLLER A IN MULTIBUS FAILOVER WITH CONTROLLER B
BOTH CONTROLLERS' PORT_1_TOPOLOGY = LOOP_HARD
BOTH CONTROLLERS' PORT_2_TOPOLOGY = LOOP_HARD
CONTROLLER A PORT_1_AL_PA = CONTROLLER B PORT_1_AL_PA
CONTROLLER A PORT_2_AL_PA = CONTROLLER B PORT_2_AL_PA
HOST A OFFSET = 0
44 HOST B OFFSET = 0
D0-D7 ACCESS ID= HOSTA1P1, HOSTA2P1, HOSTB1P2, HOSTB2P2
D0-D7 PREFER_PATH = THIS OR OTHER_CONTROLLER

HOST CONNECTIONS :

| NAME | PORT | CONTROLLER | OFFSET (46) | HOST MODE (48) |
|---|---|---|---|---|
| HOSTA1P1 | 1 | THIS | 0 | NT |
| HOSTA2P1 | 1 | OTHER | 0 | NT |
| HOSTA1P2 | 2 | OTHER | 0 | NT |
| HOSTA2P2 | 2 | THIS | 0 | NT |
| HOSTB1P1 | 1 | THIS | 0 | VMS |
| HOSTB2P1 | 1 | OTHER | 0 | VMS |
| HOSTB1P2 | 2 | OTHER | 0 | VMS |
| HOSTB2P2 | 2 | THIS | 0 | VMS |

DEFINITIONS :
NA - NOT ACCESSIBLE
CLUSTERED HOSTS - ALL LUNS ARE SHARED BETWEEN HOSTS

CONNECTION NAMES HAVE THE FOLLOWING CONVENTION:
[HOST NAME] [ADAPTER NUMBER] P[PORT NUMBER]

*Fig. 5B*

CONFIGURATION SETUP :
CONTROLLER A IN MULTIBUS FAILOVER WITH CONTROLLER B
CONTROLLER A PORT_1_TOPOLOGY = LOOP_HARD
CONTROLLER B PORT_1_TOPOLOGY = LOOP_HARD
CONTROLLER A PORT_1_ALPA = CONTROLLER B PORT_1_ALPA
HOST A OFFSET = 0
44   HOST B OFFSET = 0
D0-D7 ACCESS ID= HOSTA1P1, HOSTA2P1, HOSTB1P1, HOSTB2P1
D0-D7 PREFER_PATH = THIS OR OTHER_CONTROLLER

HOST CONNECTIONS :

| NAME | PORT | CONTROLLER | OFFSET (46) | HOST MODE (48) |
|---|---|---|---|---|
| HOSTA1P1 | 1 | THIS | 0 | NT |
| HOSTA2P1 | 1 | OTHER | 0 | NT |
| HOSTB1P1 | 1 | THIS | 0 | VMS |
| HOSTB2P1 | 1 | OTHER | 0 | VMS |

DEFINITIONS :
NA - NOT ACCESSIBLE
CLUSTERED - ALL LUNS ARE SHARED BETWEEN HOSTS

CONNECTION NAMES HAVE THE FOLLOWING CONVENTION:
[HOST NAME] [ADAPTER NUMBER] P[PORT NUMBER]

*Fig. 6B*

CONTROLLER CONFIGURATION SETUP :
CONTROLLER A IN MULTIBUS FAILOVER WITH CONTROLLER B
BOTH CONTROLLERS' PORT_1_TOPOLOGY = FABRIC
BOTH CONTROLLERS' PORT_2_TOPOLOGY = FABRIC
CONTROLLER A PORT 1 CONNECTED TO SWITCH 1, PORT X
CONTROLLER B PORT 1 CONNECTED TO SWITCH 2, PORT X
CONTROLLER A PORT 2 CONNECTED TO SWITCH 1, PORT Y
CONTROLLER B PORT 2 CONNECTED TO SWITCH 2, PORT Y
HOST A OFFSET = 0
44 HOST B OFFSET = 0
D0-D7 ACCESS ID= HOSTA1P1, HOSTA2P1, HOSTB1P2, HOSTB2P2
D0-D7 PREFER_PATH = THIS OR OTHER_CONTROLLER

HOST CONNECTIONS :

| NAME | PORT | CONTROLLER | OFFSET | HOST MODE |
|------|------|------------|--------|-----------|
| HOSTA1P1 | 1 | THIS | 0 | NT |
| HOSTA1P2 | 2 | THIS | 0 | NT |
| HOSTA2P1 | 1 | OTHER | 0 | NT |
| HOSTA2P2 | 2 | OTHER | 0 | NT |
| HOSTB1P1 | 1 | THIS | 0 | VMS |
| HOSTB1P2 | 2 | THIS | 0 | VMS |
| HOSTB2P1 | 1 | OTHER | 0 | VMS |
| HOSTB2P2 | 2 | OTHER | 0 | VMS |

DEFINITIONS :
NA - NOT ACCESSIBLE
CLUSTERED HOSTS - ALL LUNS ARE SHARED BETWEEN HOSTS

CONNECTION NAMES HAVE THE FOLLOWING CONVENTION:
[HOST NAME] [ADAPTER NUMBER] P[PORT NUMBER]

*Fig. 7B*

CONFIGURATION SETUP :
CONTROLLER A IN MULTIBUS FAILOVER WITH CONTROLLER B
BOTH CONTROLLERS' PORT_1_TOPOLOGY = LOOP_HARD
BOTH CONTROLLERS' PORT_2_TOPOLOGY = LOOP_HARD
CONTROLLER A PORT_1_AL_PA = CONTROLLER B PORT_1_AL_PA
CONTROLLER A PORT_2_AL_PA = CONTROLLER B PORT_2_AL_PA
HOST A OFFSET = 0
44A HOST B OFFSET = 10
D0-D7 ACCESS ID= HOSTA1P1, HOSTA2P1
D10-D17 ACCESS ID= HOSTB1P2, HOSTB2P2
44B D0-D7 PREFER_PATH = THIS_CONTROLLER
D10-D17 PREFER_PATH = OTHER_CONTROLLER

| HOST CONNECTIONS | : | | ⟋46 | ⟋48 |
|---|---|---|---|---|
| NAME | PORT | CONTROLLER | OFFSET | HOST MODE |
| HOSTA1P1 | 1 | THIS | 0 | NT |
| HOSTA1P2 | 2 | THIS | 0 | NT |
| HOSTA2P1 | 1 | OTHER | 0 | NT |
| HOSTA2P2 | 2 | OTHER | 0 | NT |
| HOSTB1P1 | 1 | THIS | 10 | VMS |
| HOSTB1P2 | 2 | THIS | 10 | VMS |
| HOSTB2P1 | 1 | OTHER | 10 | VMS |
| HOSTB2P2 | 2 | OTHER | 10 | VMS |

DEFINITIONS :
NA - NOT ACCESSIBLE
NON CLUSTER - NO SHARED LUNS

CONNECTION NAMES HAVE THE FOLLOWING CONVENTION:
[HOST NAME] [ADAPTER NUMBER] P[PORT NUMBER]

*Fig. 8B*

CONFIGURATION SETUP :
CONTROLLER A IN MULTIBUS FAILOVER WITH CONTROLLER B
BOTH CONTROLLERS' PORT_1_TOPOLOGY = LOOP_HARD
BOTH CONTROLLERS' PORT_2_TOPOLOGY = LOOP_HARD
CONTROLLER A PORT_1_AL_PA = CONTROLLER B PORT_1_AL_PA
CONTROLLER A PORT_2_AL_PA = CONTROLLER B PORT_2_AL_PA
HOST A OFFSET = 0
HOST B OFFSET = 10
D0-D7 ACCESS ID= HOSTA1P1, HOSTA2P1
D10-D17 ACCESS ID= HOSTB1P2, HOSTB2P2
D0-D7 PREFER_PATH = THIS_CONTROLLER
D10-D17 PREFER_PATH = OTHER_CONTROLLER

HOST CONNECTIONS :

| NAME | PORT | CONTROLLER | OFFSET | HOST MODE |
|---|---|---|---|---|
| HOSTA1P1 | 1 | THIS | 0 | NT |
| HOSTA2P1 | 1 | OTHER | 0 | NT |
| HOSTA1P2 | 2 | OTHER | 0 | NT |
| HOSTA2P2 | 2 | THIS | 0 | NT |
| HOSTB1P1 | 1 | THIS | 0 | VMS |
| HOSTB2P1 | 1 | OTHER | 10 | VMS |
| HOSTB1P2 | 2 | OTHER | 10 | VMS |
| HOSTB2P2 | 2 | THIS | 10 | VMS |

DEFINITIONS :
NA - NOT ACCESSIBLE
NON CLUSTER - NO SHARED LUNS

CONNECTION NAMES HAVE THE FOLLOWING CONVENTION:
[HOST NAME] [ADAPTER NUMBER] P[PORT NUMBER]

*Fig. 9B*

CONFIGURATION SETUP :
CONTROLLER A IN MULTIBUS FAILOVER WITH CONTROLLER B
BOTH CONTROLLERS' PORT_1_TOPOLOGY = LOOP_HARD
CONTROLLER A PORT_1_AL_PA = CONTROLLER B PORT_1_AL_PA
HOST A OFFSET = 0
44A HOST B OFFSET = 10
    D0-D7 ACCESS ID= HOSTA1P1, HOSTA2P1
    D10-D17 ACCESS ID= HOSTB1P1, HOSTB2P1
44B D0-D7 PREFER_PATH = THIS_CONTROLLER
    D10-D17 PREFER_PATH = OTHER_CONTROLLER

| HOST CONNECTIONS | : | | 46 | 48 |
|---|---|---|---|---|
| NAME | PORT | CONTROLLER | OFFSET | HOST MODE |
| HOSTA1P1 | 1 | THIS | 0 | NT |
| HOSTA2P1 | 1 | OTHER | 0 | NT |
| HOSTB1P1 | 1 | THIS | 10 | VMS |
| HOSTB2P1 | 1 | OTHER | 10 | VMS |

DEFINITIONS :
NA - NOT ACCESSIBLE
NON CLUSTER - NO SHARED LUNS

CONNECTION NAMES HAVE THE FOLLOWING CONVENTION:
[HOST NAME] [ADAPTER NUMBER] P[PORT NUMBER]

*Fig. 10B*

CONFIGURATION SETUP :
CONTROLLER A IN MULTIBUS FAILOVER WITH CONTROLLER B
BOTH CONTROLLERS' PORT_1_TOPOLOGY = FABRIC
BOTH CONTROLLERS' PORT_2_TOPOLOGY = FABRIC
CONTROLLER A PORT 1 CONNECTED TO SWITCH 1, PORT X
CONTROLLER B PORT 1 CONNECTED TO SWITCH 2, PORT X
CONTROLLER A PORT 2 CONNECTED TO SWITCH 1, PORT Y
CONTROLLER B PORT 2 CONNECTED TO SWITCH 2, PORT Y
HOST A OFFSET = 0
HOST B OFFSET = 10
D0-D7 ACCESS ID= HOSTA1P1, HOSTA2P1
D10-D17 ACCESS ID= HOSTB1P2, HOSTB2P2
D0-D7 PREFER_PATH = THIS_CONTROLLER
D10-D17 PREFER_PATH = OTHER_CONTROLLER

HOST CONNECTIONS :

| NAME | PORT | CONTROLLER | OFFSET | HOST MODE |
|---|---|---|---|---|
| HOSTA1P1 | 1 | THIS | 0 | NT |
| HOSTA1P2 | 2 | THIS | 0 | NT |
| HOSTA2P1 | 1 | OTHER | 0 | NT |
| HOSTA2P2 | 2 | OTHER | 0 | NT |
| HOSTB1P1 | 1 | THIS | 10 | VMS |
| HOSTB1P2 | 2 | THIS | 10 | VMS |
| HOSTB2P1 | 1 | OTHER | 10 | VMS |
| HOSTB2P2 | 2 | OTHER | 10 | VMS |

DEFINITIONS :
NA - NOT ACCESSIBLE
NON CLUSTER - NO SHARED LUNS

CONNECTION NAMES HAVE THE FOLLOWING CONVENTION:
[HOST NAME] [ADAPTER NUMBER] P[PORT NUMBER]

*Fig. 11B*

SYSTEM AND METHOD FOR SELECTIVELY PRESENTING LOGICAL STORAGE UNITS TO MULTIPLE HOST OPERATING SYSTEMS IN A NETWORKED COMPUTING SYSTEM

INCORPORATION BY REFERENCE

The contents and disclosure of commonly assigned U.S. patent application Ser. No. 08/071,710, filed Jun. 4, 1993, entitled "FAULT TOLERANT STORAGE CONTROLLER UTILIZING TIGHTLY COUPLED DUAL CONTROLLER MODULES," by Sicola et al., is hereby incorporated by reference in its entirety.

BACKGROUND OF THE INVENTION

1. Field of the Invention

This invention relates in general to storage devices in a networked computer system. More particularly, this invention relates to a system and method for selectively presenting logical storage units to multiple host operating systems.

2. Background

In computing systems, mass storage systems often contain a plurality of storage devices arranged in various configurations to provide improved data reliability. For instance, SCSI disk drives, can be arranged in disk arrays (i.e., RAID array), disk mirrors, hot spares, or in other arrangements employing complex data storage techniques which provide redundant data storage and increased data reliability. Storage subsystems having a variety of disk drives generally present the disk drives or array of disk drives as a single addressable entity or logical unit (LUN) to the host computing system (i.e., servers, personal computers, work stations, or CPUs generally) to which the storage subsystem is connected. In this manner, the storage subsystem appears, from the perspective of the host computing system, as a single entity and the complex data storage techniques employed by the storage subsystem are transparent to the host computing system.

In many computing systems, multiple hosts are coupled to one or more storage devices. However, some operating systems do not gracefully share access to the same storage devices with other host operating systems. Because of this, conflicts can occur that can be devastating, such as overwrites of home blocks on previously initialized disks, reservations being taken out on disks which a host should not be reserving, improper reformatting, overwriting of files, or other conflicts.

For example, if the host computing systems do not share the same file pointers, then data corruption on the logical unit may occur due to the non-cooperative nature of the host computing systems, such as one host writing over another host's data. In a homogeneous computing environment having a plurality of host computing systems utilizing the same operating system (i.e., NT systems, Windows systems, etc.), each host operating system may attempt to write to or control all of the logical units present in the computing system. In a heterogeneous computing environment, wherein a plurality of host computing systems utilize different operating systems in each host (i.e., NT, Sun, UNIX, or VMS operating systems), a potential for data corruption exists if all the operating systems write to and control the same logical units.

One prior approach to address this problem is to provide some intelligence at the host computing system level as to which logical units the host should control. However, this approach is problematic because the host computing system, during normal initialization, will communicate, to discover all old/new devices, with all of the logical units in the computing system, and corruption of the data stored in the logical units can still occur when the host initially communicates with the logical units.

Moreover, many operating systems have idiosyncrasies with respect to their interactions with the logical units of the storage subsystem. In particular, some operating systems, such as Windows NT, expect that the logical units have addressable numbers in a particular predefined range (i.e., 0–7). Accordingly, if multiple host operating systems require that the logical units be numbered 0–7, or have other unit addressing requirements, it may be difficult to determine which logical units are intended to be affected by a particular command from a particular host operating system. Further, such numbering requirements would limit the total number of drives presentable to the host operating system to eight.

It is with these shortcomings of the existing art in mind that the present invention was developed. What is needed is a system and method for selectively presenting the logical units to a host computing system in order that the problems associated with non-cooperative hosts are reduced, while providing unique host modes adapted to account for the idiosyncrasies of each particular host operating system. Further, multiple hosts should be capable of having their own set of unique logical units numbered 0–7.

SUMMARY OF THE INVENTION

In light of the above, therefore, in one embodiment of the present invention, disclosed herein is a storage system capable of selectively presenting logical units to one or more host computing systems. The storage system comprises one or more persistent storage devices arranged as logical units; an array controller controlling and coordinating the operations of the persistent storage devices; a memory accessible by the array controller; and a configuration table stored in the memory, the configuration table containing one or more entries governing the interactions between the logical units and the one or more host computing systems. The configuration table contains an entry for each logical unit which the array controller accesses to determine if a particular logical unit should communicate with a particular one of the host computing systems that may communicate with the array controller. The configuration table can also contain an entry for each logical unit which the array controller accesses to determine if a particular logical unit should communicate with a particular one of the host computing systems using an internal offset for a logical unit number, and an entry for each logical unit which the array controller accesses to determine if a particular logical unit should communicate with a particular one of the host computing systems using a predetermined host mode.

In this manner, the corruption of data from non-cooperative hosts can be eliminated, and LUN offsets can be employed where needed if the host operating systems require the LUN numbers to be in a particular range.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 2 illustrates an exemplary unit configuration table in accordance with the present invention.

FIG. 4B illustrates an exemplary configuration file corresponding to the system shown in FIG. 4A.

FIG. 5B illustrates an exemplary configuration file corresponding to the system shown in FIG. 5A.

FIG. 6B illustrates an exemplary configuration file corresponding to the system shown in FIG. 6A.

FIG. 7B illustrates an exemplary configuration file corresponding to the system shown in FIG. 7A.

FIG. 8B illustrates an exemplary configuration file corresponding to the system shown in FIG. 8A.

FIG. 9B illustrates an exemplary configuration file corresponding to the system shown in FIG. 9A.

FIG. 10B illustrates an exemplary configuration file corresponding to the system shown in FIG. 10A.

FIG. 11B illustrates an exemplary configuration file corresponding to the system shown in FIG. 11A.

DETAILED DESCRIPTION OF THE PREFERRED EMBODIMENT

In accordance with the present invention, a system and method for selectively presenting logical units (LUNs) to host computing systems is disclosed herein. The system utilizes configuration tables which are stored in the nonvolatile RAM (NVRAM) of the array controllers, as will be discussed below. The configuration tables store information relating to which host connection a particular logical unit should communicate with, any LUN numbers offsets employed by the logical unit to communicate with a particular host, and any special "host modes" employed by the array controller in communicating with a particular host.

In accordance with the present invention, each logical unit has a list of each host connection which it is permitted to communicate with. The list is stored in the configuration tables which are accessible by the array controller.

The configuration tables also contain a set of offsets which correspond to each host connection. If a particular host operating system requires that the logical units be numbered in a predefined range, then in accordance with the present invention, a logical unit offset is used within the controller so that unique internal logical unit numbers can map to the required range of logical unit numbers required by the particular host operating system. In this manner, the offsets permit communications between the logical units and host systems which require a limited number or range of logical unit numbers. These offsets are particularly useful for gracefully implementing logical units in legacy systems such as NT systems, which do not recognize logical units on a single target beyond numbers 0–7.

The offset, along with the selective logical unit presentation, permits multiple hosts to interact with the same predetermined logical unit numbers (i.e., LUN 0–7), without conflicting with other hosts accessing the same storage device. For example, if a host needs to see LUN 0–7, the array controller would set up the host to access, for example, LUN numbers 14–21 using a LUN offset of 14. The offset is used by the array controller to calculate the LUN number which the specified host should see when the host accesses the logical unit.

The system also provides for unique host "modes" adapted to be employed uniquely to each host operating system to which the logical unit, through the array controller, is coupled. These unique host modes permit the array controller to be adaptable to handle different idiosyncrasies of particular host operating systems.

Figure 1:
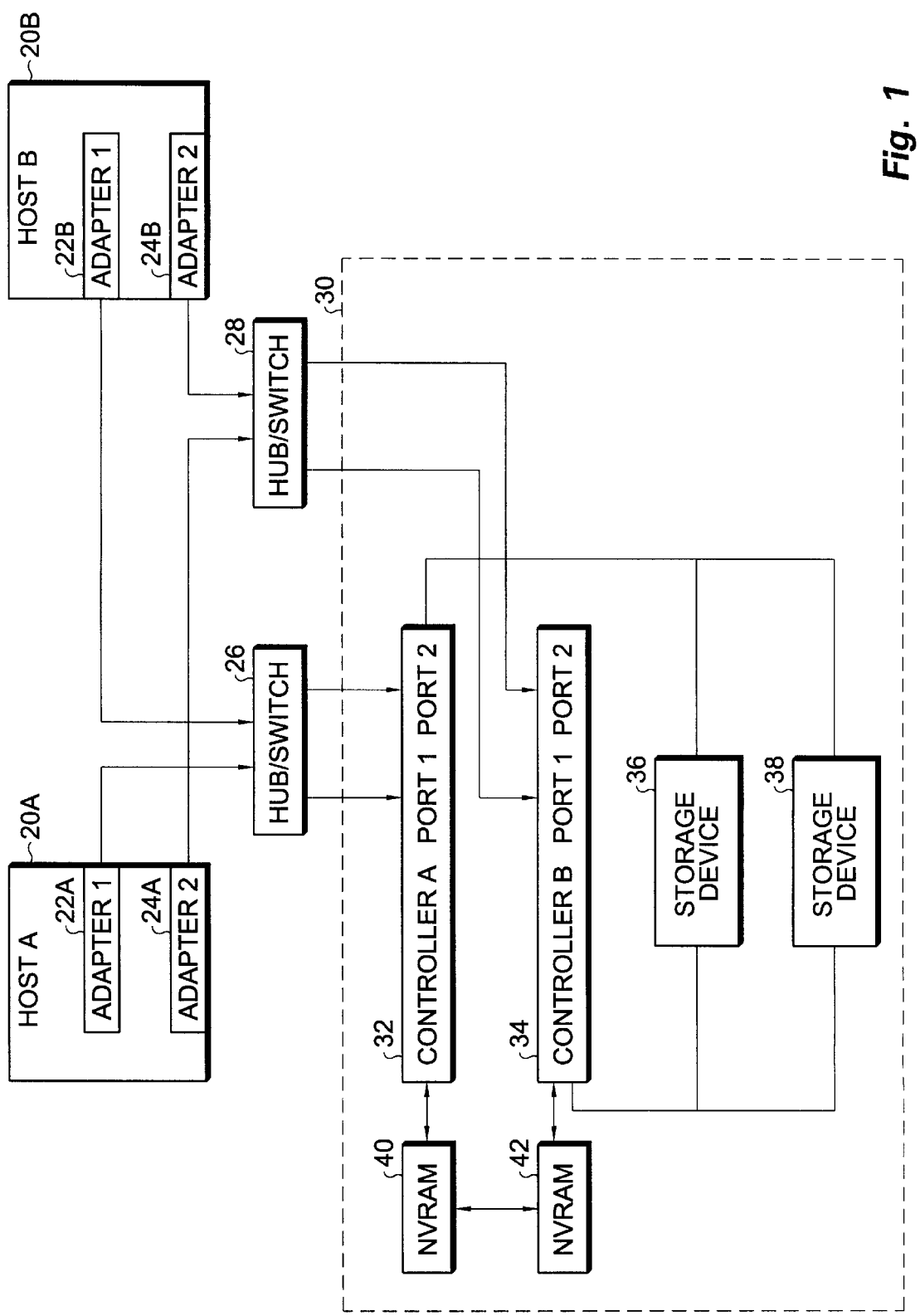
FIG. 1 illustrates a computing system having a pair of host computing systems, coupled through adapters and a hub/switch, to a pair of array controllers, in accordance with one embodiment of the present invention.

Referring to FIG. 1, a pair of host computing systems 20A, 20B is shown wherein each host computing system has a pair of adapters 22A, 22B, 24A, 24B which are coupled to different hubs/switches 26, 28. The host computing systems 20A, 20B can each employ the same or different operating systems, such as operating systems of Microsoft Windows, NT, Sun, Unix, VMS, etc. The present invention permits these multiple hosts to utilize logical units of a storage device 30, each their own, without corrupting the data from a logical unit which does not correspond to a particular host computing system.

As shown in FIG. 1, host computing system 20A has a first adapter 22A and a second adapter 24A each coupled to a separate hub/switch 26, 28. The adapters are interfaces between the host's internal bus (i.e., PCI bus) to a storage interconnect bus (i.e. Fibre Channel bus) of the storage devices. The hub/switches are central wiring for connecting all devices to a common bus. As shown in FIG. 1, each hub/switch 26, 28 is coupled to a port of an array controller 32, 34, the array controllers 32, 34 controlling one or more storage devices 36, 38 coupled thereto. The array controllers 32, 34 shown in FIG. 1 are arranged in a multi-bus "failover" arrangement which provides data integrity in the event that one of the controllers fails. The arrays present, or make visible, logical units (LUNs) over both of these buses to attached hosts. Each array controller 32, 34 is coupled to nonvolatile RAM 40, 42, which is used according to one example of the present invention for storing configuration tables. Either controller 32, 34 accesses the configuration tables stored in the NVRAM 40, 42, which can be shared between controllers. One example of a "failover" arrangement is shown and described in the afore-mentioned U.S. patent application Ser. No. 08/071,710.

FIGS. 2 and 4B–11B show examples of the data used in a configuration table in accordance with the present invention. The configuration table includes an entry identifying each logical unit (i.e., D0, D1, D2, D3, etc.), and for each logical unit, a plurality of data fields related to that logical unit, such as which host adapters the LUN should grant access to and communicate with, any offset for the LUN number to be used for a particular host, and any special host modes for the particular host adapter.

Referring to FIG. 2, exemplary characteristics of LUNs D0, D1, D2, and D3 are shown. In particular, an access field 44 is shown, which indicates the hosts/adapters which are permitted to access a particular LUN. For example, as shown in FIG. 2, HOSTA1P1 is permitted to access D0, D1, D2 and D3 in this example. Other examples of access fields are shown in FIGS. 4B–11B. As will be explained below, the data fields in the configuration table generally comprise access fields 44, offset fields 46, and host mode fields 48.

Figure 3:
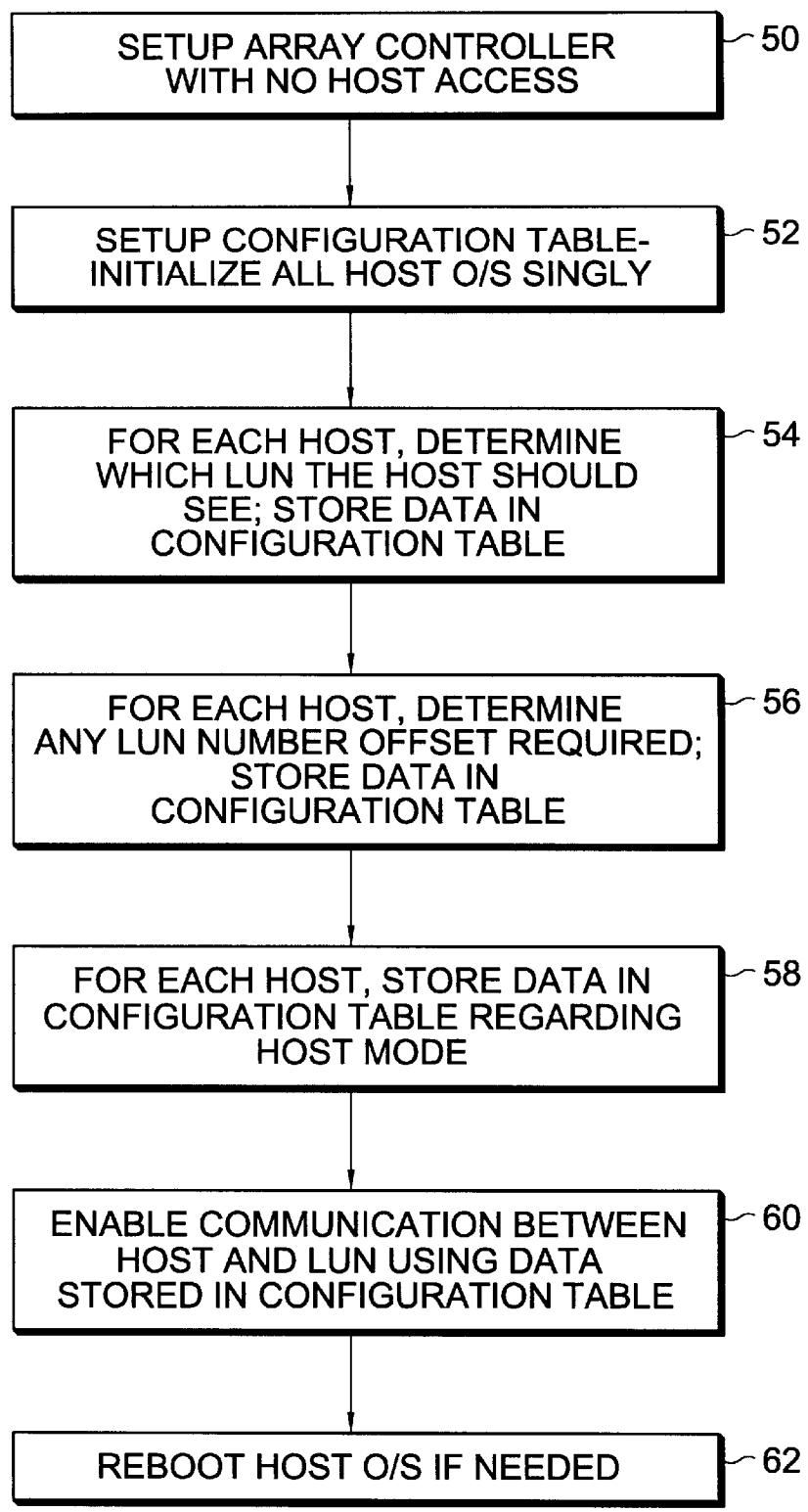
FIG. 3 is a logical flow diagram illustrating the operations for building the configuration table in nonvolatile memory of the controllers, in accordance with one embodiment of the present invention.

Referring to FIG. 3, a logical flow diagram for building data for the configuration table in nonvolatile memory is shown. At operation 50, the array controller is initially set up so that no access is provided to any host operating system. This step is performed before the hosts are powered up and initialized, and therefore insures that when the hosts are initialized, the hosts cannot access any logical units in the computing system, irrespective of any physical connection between the hosts and the array controllers. Operation 50 can include a step wherein the array controller ignores any requests from any hosts once the host is initialized.

In operation 52, each host is initialized and enabled, one at a time. Since the hosts are coupled to the array controllers, the hosts are permitted to connect to the array controller, however, no logical units are viewable by the hosts as the array controllers were configured at operation 50 with no access and accordingly are not responsive to the requests of the host operating systems. Operation 52 permits the array controller to obtain the worldwide identification (WWID) of the host when the host's adapter connects to the array controller. Every adapter in every host has a WWID. The array controller then stores this worldwide ID into the configuration table in an entry corresponding to the particular host. Operation 52 is repeated until every adapter in every host in the computing system has been enabled and initialized, and the array controller creates an entry in the configuration table with the worldwide ID of each host operating system in the computer network.

At operation 54, the system administrator determines which logical units each host should have access to, and edits the configuration table of the array controller so that each host only "sees" (i.e., has access to) the logical unit or logical units which the system administrator has determined should be viewable by that particular host. In one example, the system administrator can set and modify the values stored in the configuration table through a graphical user interface running on a host system, or directly through a terminal coupled to the controller through a standard communication port (not shown).

Figure 4A:
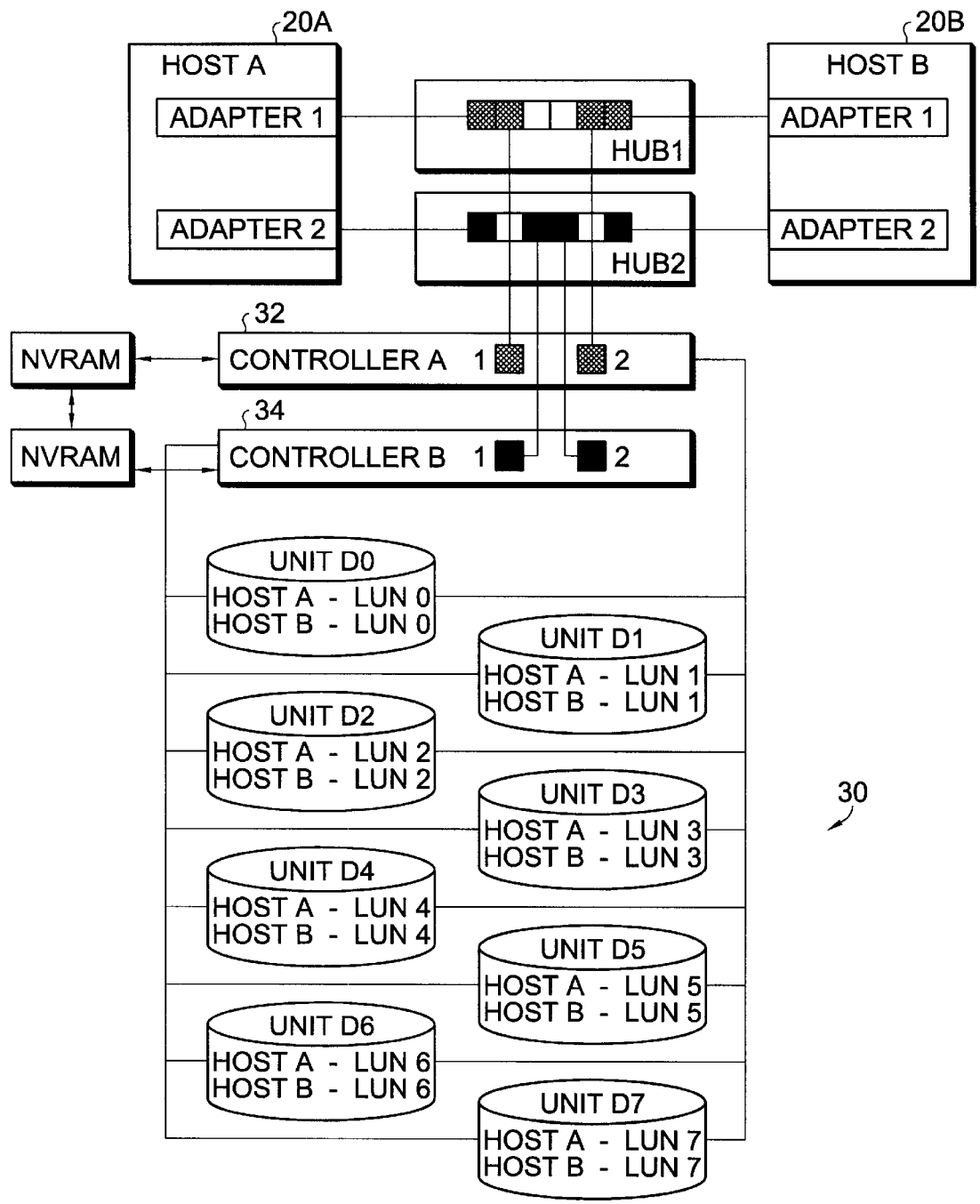
FIG. 4A illustrates a pair of hosts coupled to logical units, wherein the hosts are configured as clustered hosts, and the logical units are arranged in a multi-bus configuration.
Figure 5A:
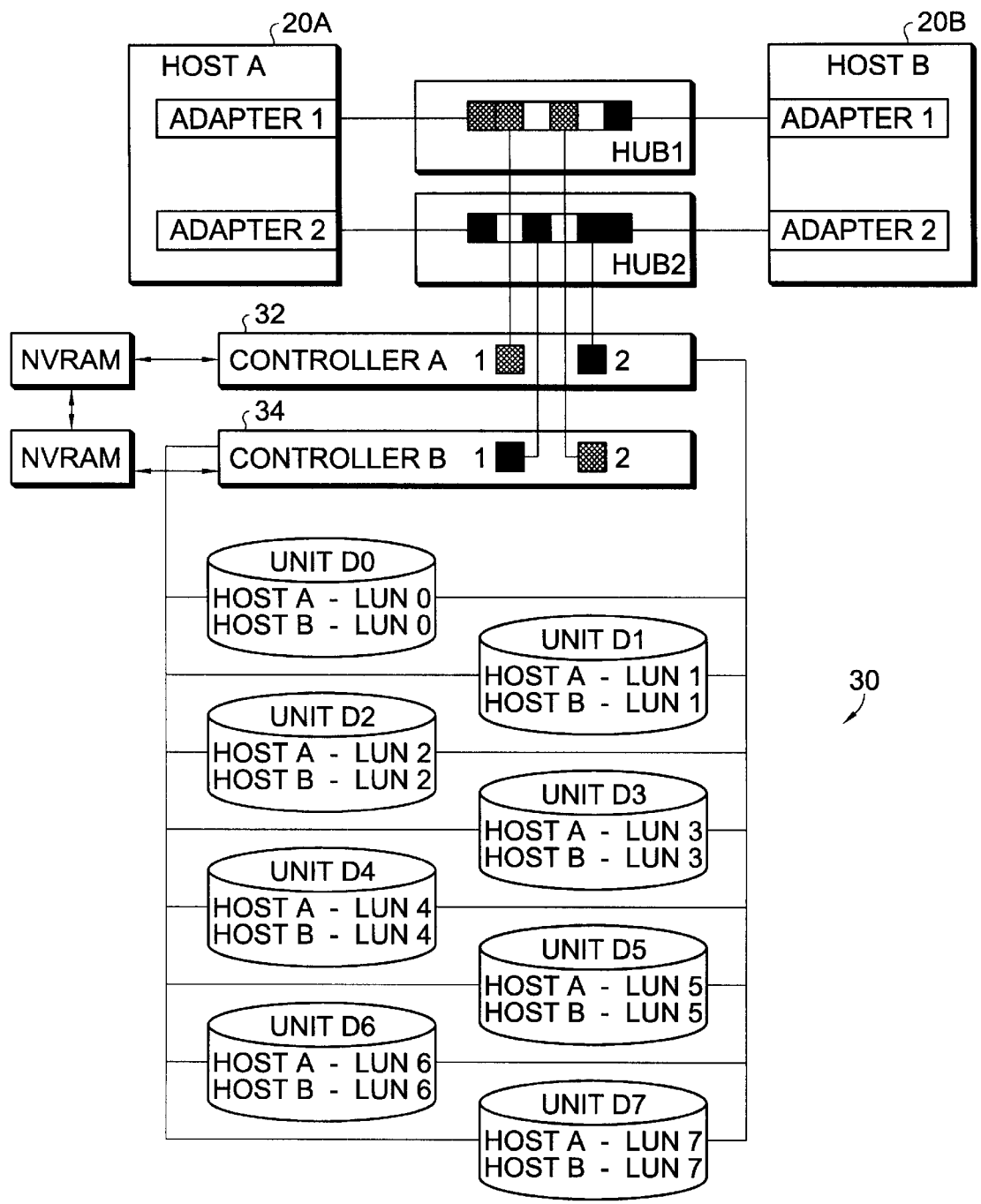
FIG. 5A illustrates a pair of hosts coupled to logical units, wherein the hosts are configured as clustered hosts, and the logical units are arranged in a multi-bus configuration.
Figure 6A:
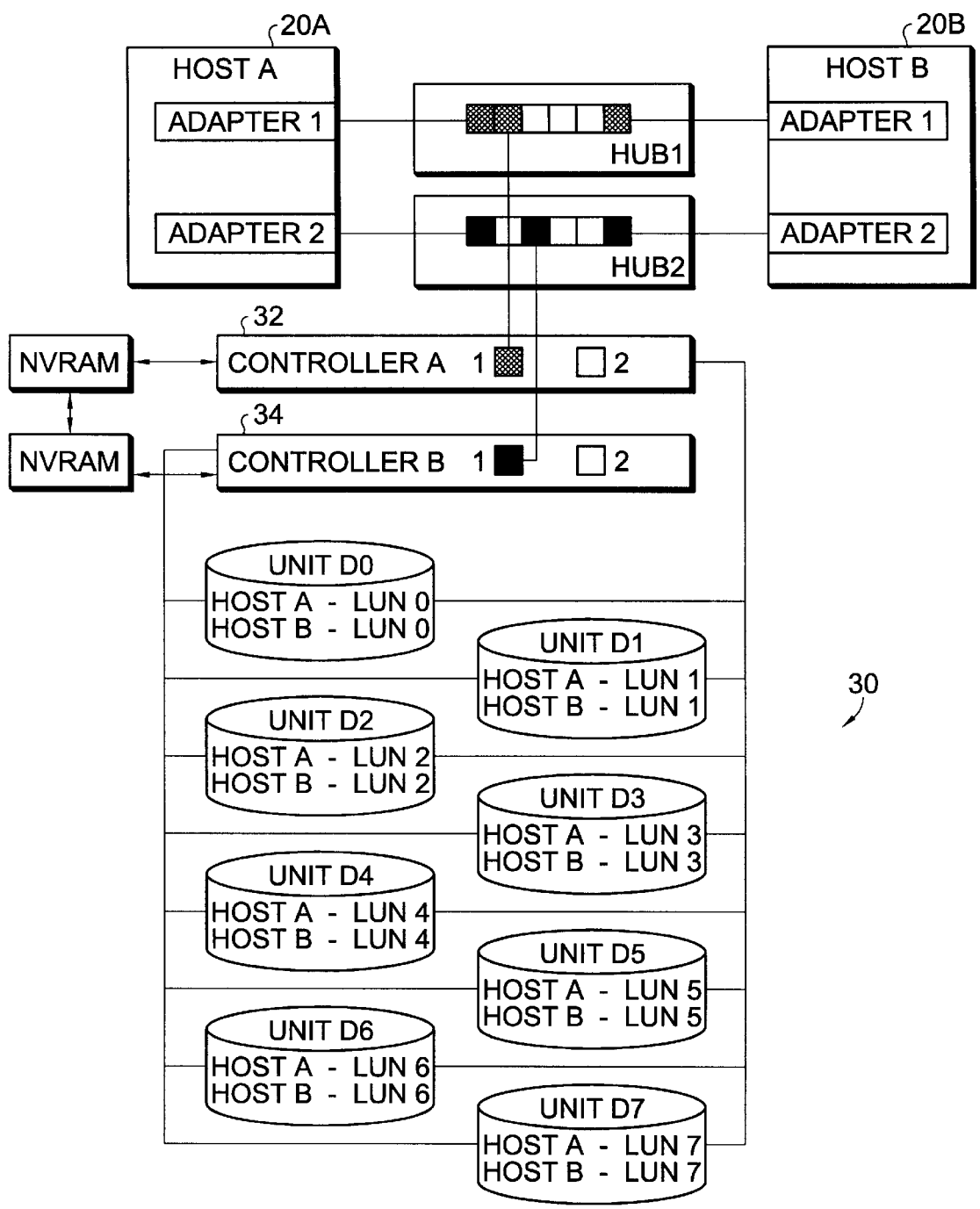
FIG. 6A illustrates a pair of hosts coupled to logical units, wherein the hosts are configured as clustered hosts, and the logical units are arranged in a multi-bus configuration.
Figure 7A:
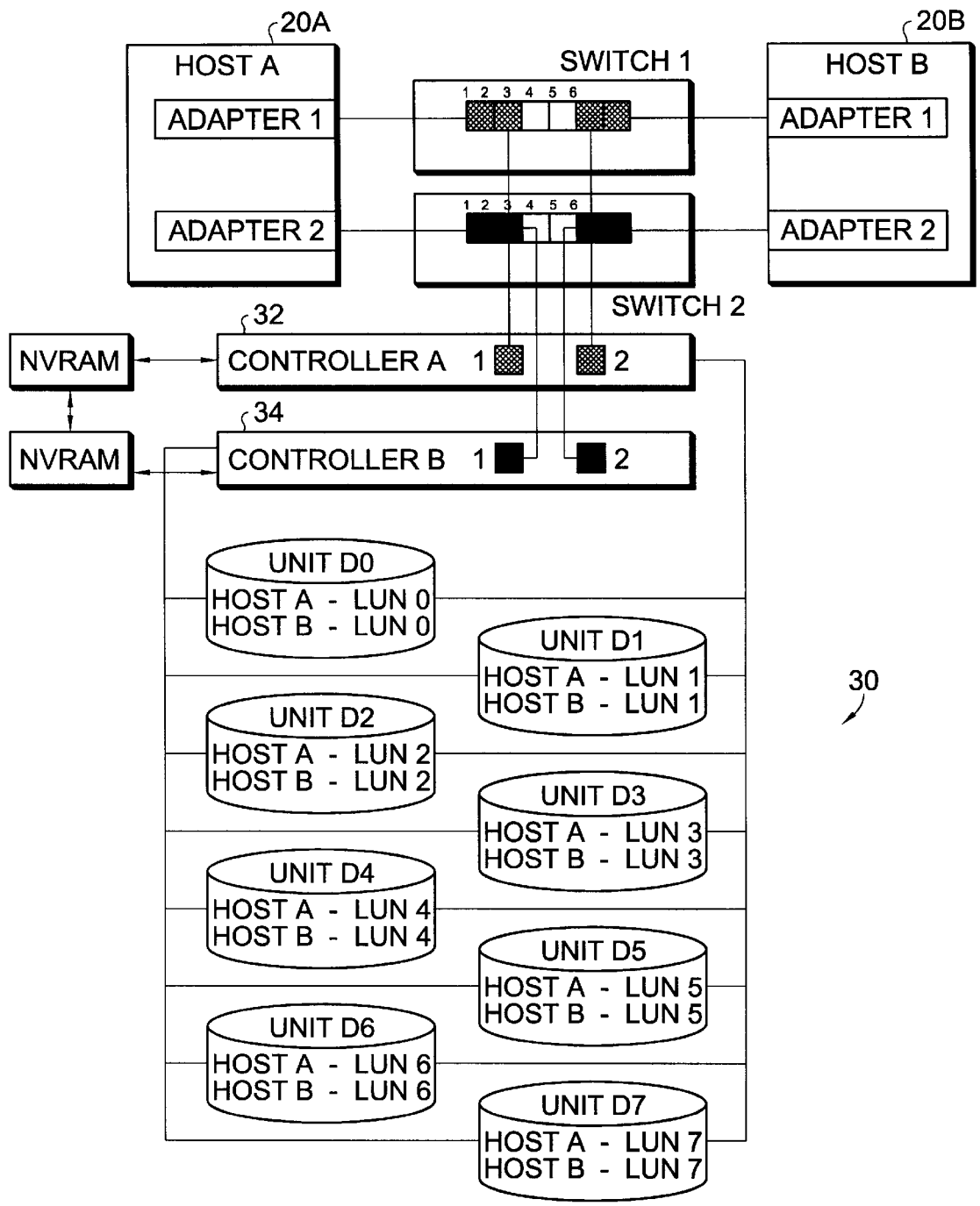
FIG. 7A illustrates a pair of hosts coupled to logical units, wherein the hosts are configured using a clustered switch, and the logical units are arranged in a multi-bus configuration.
Figure 8A:
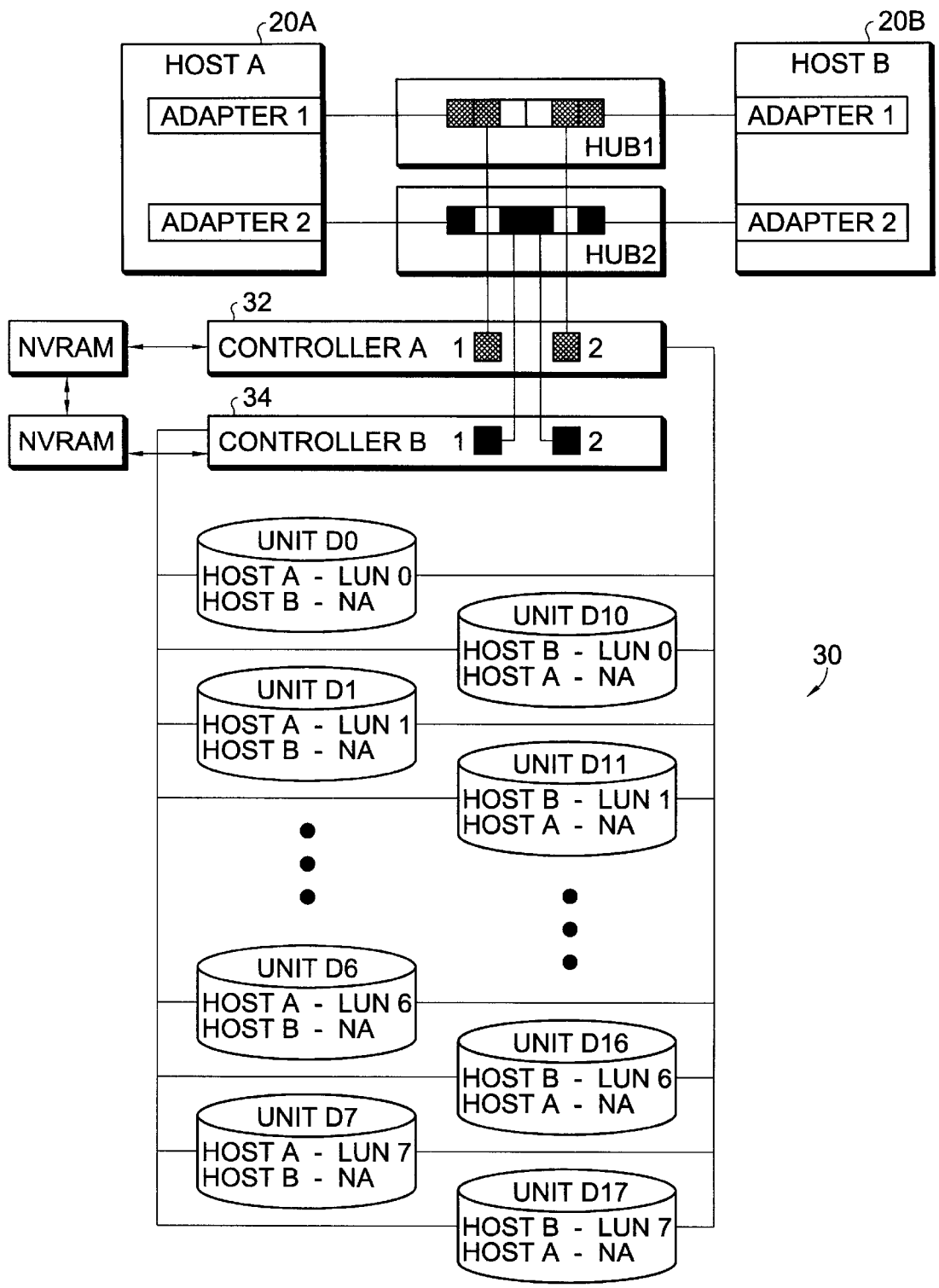
FIG. 8A illustrates a pair of hosts coupled to logical units, wherein the hosts are configured as non-clustered hosts, and the logical units are arranged in a multi-bus configuration.
Figure 9A:
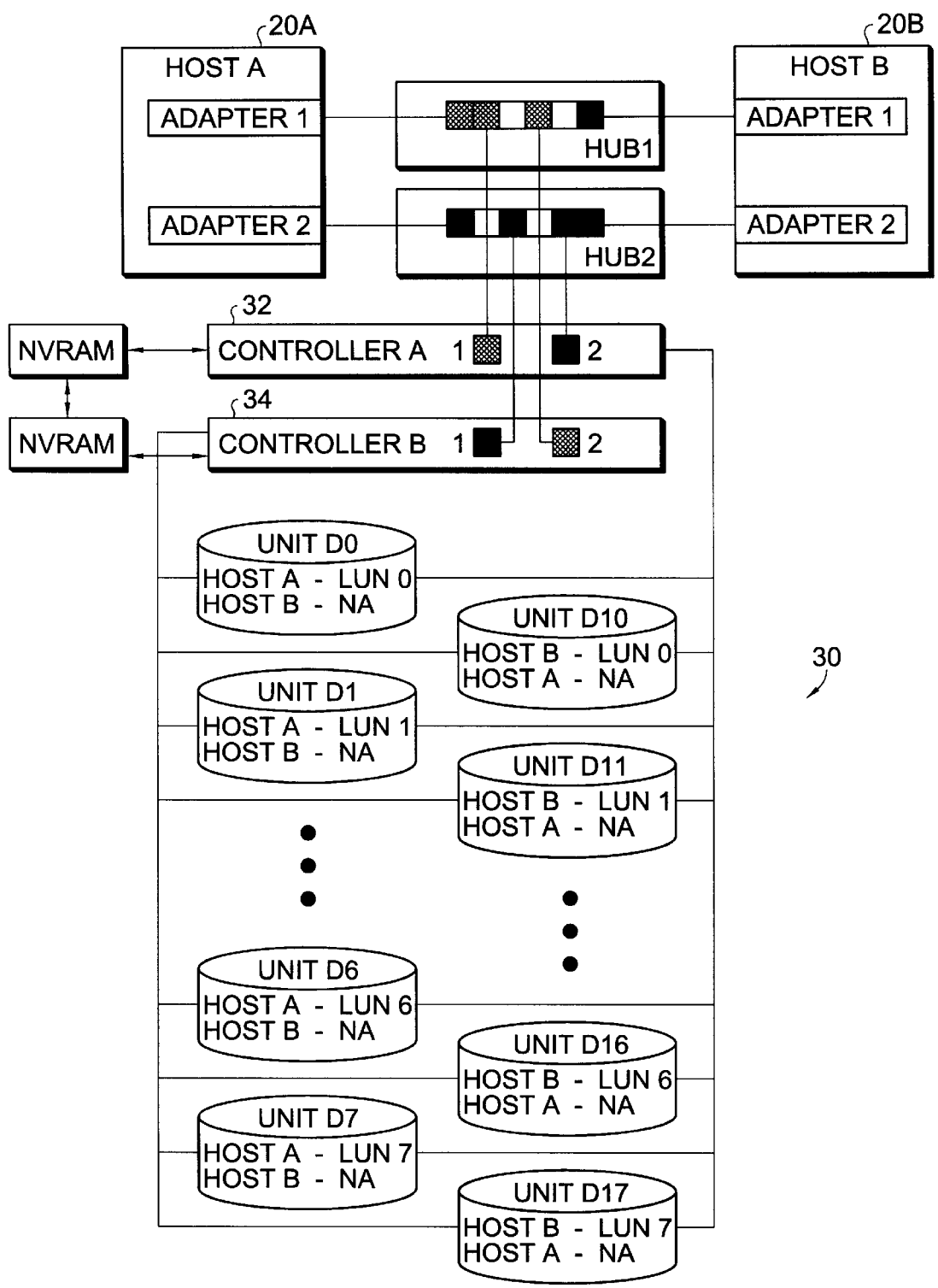
FIG. 9A illustrates a pair of hosts coupled to logical units, wherein the hosts are configured as non-clustered hosts, and the logical units are arranged in a multi-bus configuration.
Figure 10A:
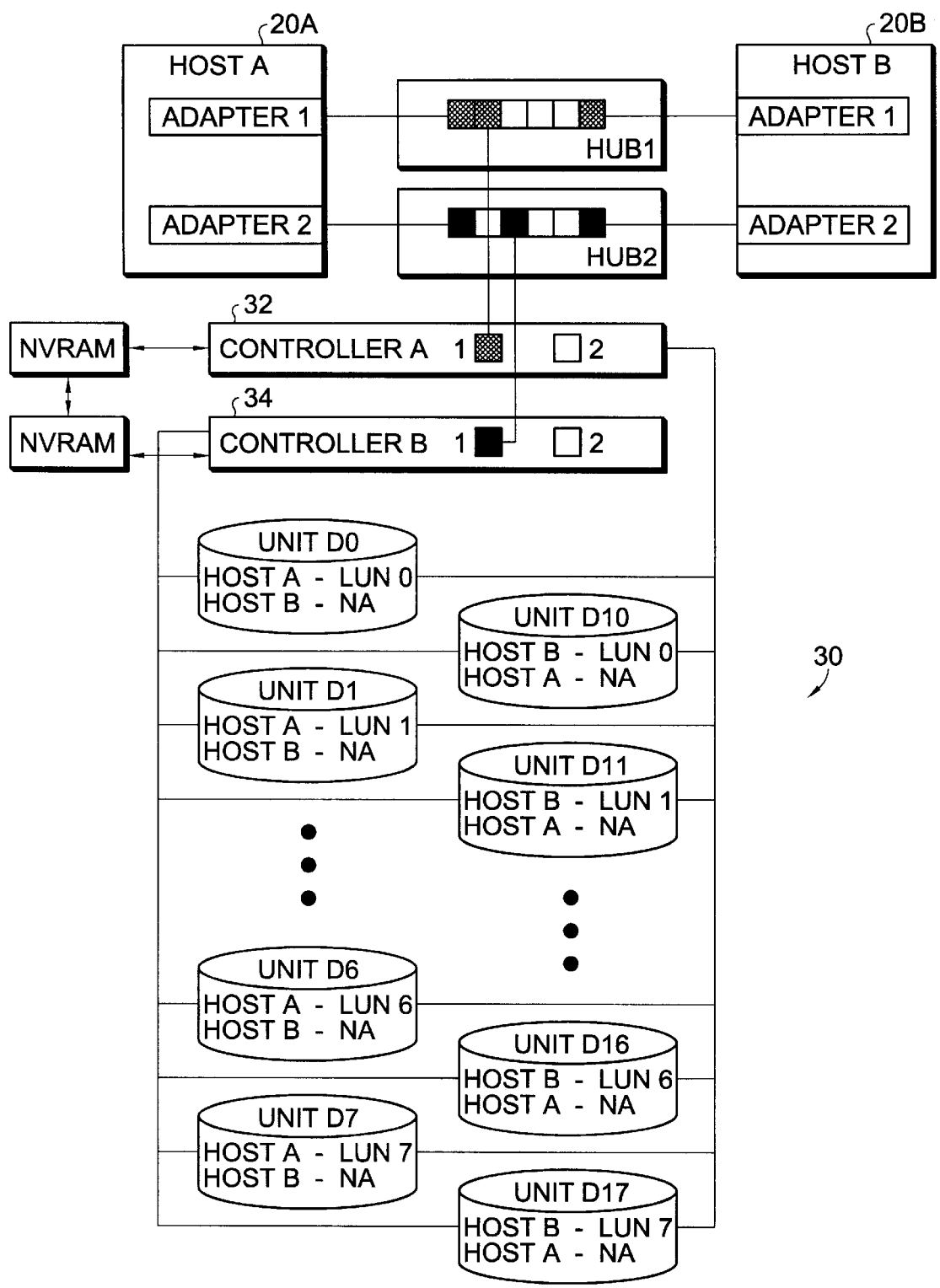
FIG. 10A illustrates a pair of hosts coupled to logical units, wherein the hosts are configured as non-clustered hosts, and the logical units are arranged in a multi-bus configuration.
Figure 11A:
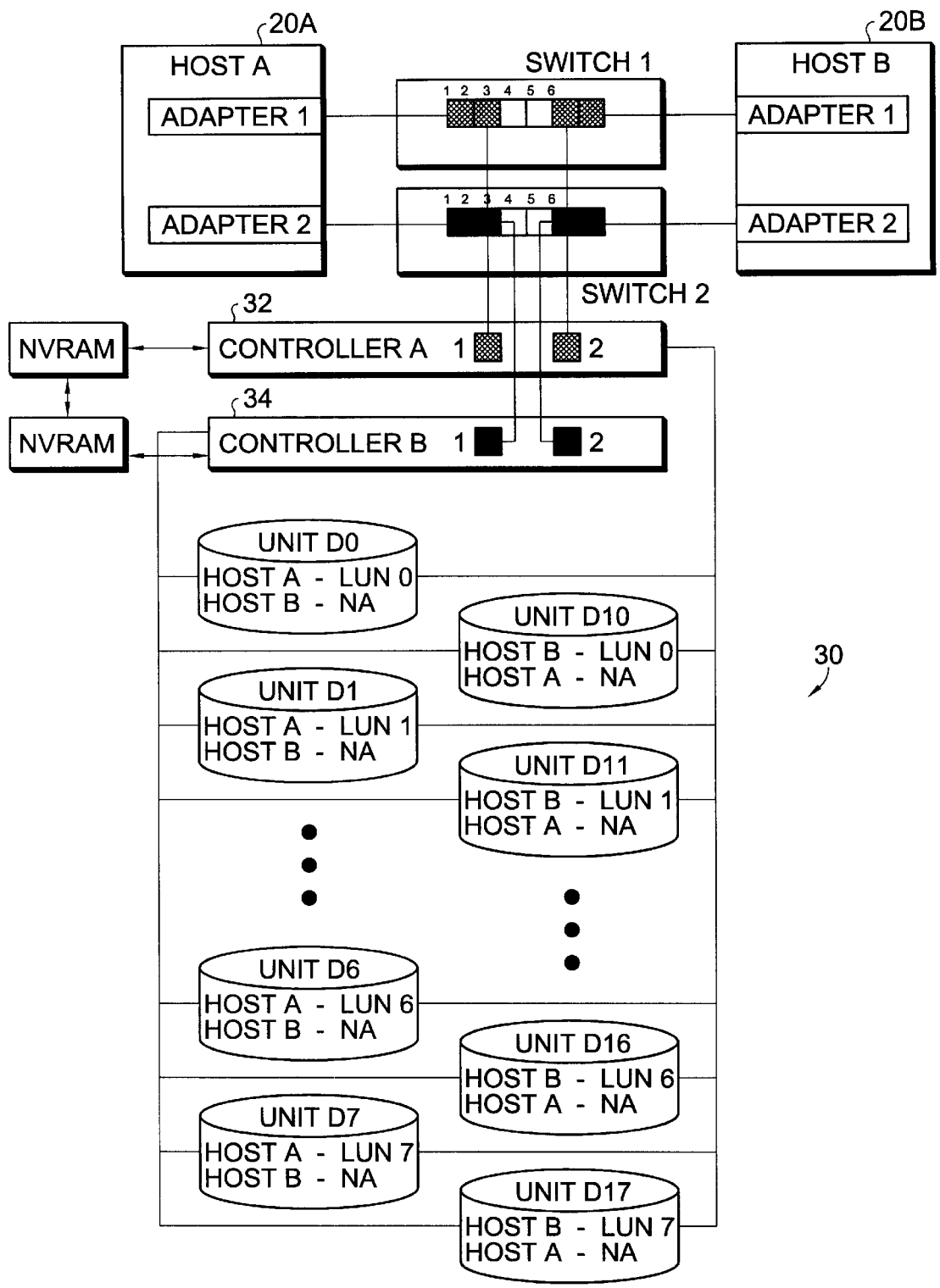
FIG. 11A illustrates a pair of hosts coupled to logical units, wherein the hosts are configured using a non-clustered switch, and the logical units are arranged in a multi-bus configuration.

In this manner, the configuration tables are used by the system administrator to prevent a host from interacting with logical units which are assigned to other hosts in the computing system. In one example, the system administrator configures each logical unit to be uniquely assigned to only one host. In another example, each logical unit is configured to be accessed and shared by multiple hosts, but not others. Various configurations for the logical units with respect to the hosts are shown in FIGS. 4A/4B to 11A/11B. The particular manner in which the logical units are mapped to the multiple hosts is a matter of choice dependent upon the particular implementation in the computing system, and may depend upon the compatibility of the particular operating systems utilized by each of the hosts in the computing system.

At operation 56, the system administrator determines if any offsets are required by a particular host operating system, and if so, these offsets are stored in the configuration table corresponding to the particular host connection. In this manner, if a particular host operating systems requires that the logical units be numbered 0–7, the array controller can internally number the logical units using the offset. FIGS. 4B–11B show various examples of data of the configuration table. When the array controller processes a data request from a particular host operating system, the offset stored in the configuration table corresponding to the particular host operating system is used by the array controller to internally process the data request, but the offset is transparent from the perspective of the particular host operating system. In this manner, if multiple hosts require that all logical units be numbered in the same way (i.e. all logical units be numbered 0–7), the array controller can utilize different and unique disks or storage devices to store the data from different host operating systems, thereby reducing conflicts and data corruption.

In particular, when an incoming data request from a particular host operating system arrives at the array controller, the array controller looks up in the configuration table the offset for the particular host operating system. The offset is then added to the logical unit number specified by the host operating system, and the array controller then accesses the proper logical unit. When the array controller is transmitting data to a particular host operating system, the array controller again looks up in the configuration table the offset corresponding to the particular host operating system, subtracts the offset from the internal logical unit number, and transmits the data to the proper host operating system.

At operation 58, the configuration table can also contain other "host mode" data relating to the manner in which the array controller or logical unit should account for any idiosyncrasies in communicating with a particular host. For example, if a particular host is found to operate more efficiently or more smoothly in a particular mode, then based on the host operating system type, attributes can be assigned to the particular host operating system type and stored in the configuration table by the system administrator.

At operation 60, the system administrator begins enabling each connection from the host to the logical units specified by operation 54. In this manner, the various hosts in the computing system can interact with the particular logical units previously configured. As each request for access to a logical unit is received by an array controller, the array controller accesses the configuration table to determine if the particular host is permitted to access the logical unit; if any offset is required to be internally used by the array controller for handling interactions between the logical unit and the particular host; and if any special host mode is to be used.

At operation 62, the operating systems of the hosts are rebooted. This operation may not necessarily be required for each operating system.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

FIGS. 4A to 11A show various configurations of the storage devices and their connections to the hosts through various hub or switch configurations. FIGS. 4B to 11B show examples of the data which could be used within a configuration table to provide the selective presentation of the LUNs to the host, along with the LUN number offsets and host mode data. It is understood that configurations of FIGS. 4A to 11A and the data in FIGS. 4B to 11B are by way of example only, and the particular configurations employed in any given computing system is a matter of choice dependant on the particular implementation.

Referring to FIG. 4B, an access field 44 is shown for LUNs D0–D7. This access field indicates the hosts (i.e., the host paths) which have access to LUNs D0–D7 shown in FIG. 4A. Access fields 44 are also shown in FIG. 5B–11B. In the examples shown in FIG. 8B–11B, a first access field 44A is shown for LUNs D0–D7, while a second access field 44B is shown for LUNs D10–D17.

Referring to FIG. 4B, an offset field 46 is also shown. In this example, LUNs D0–D7 are presented to Host A and Host B as LUNs 0–7, since the offset is zero. Offset fields 46 are also shown in FIGS. 5B–11B. In the example shown in FIG. 8B, HOST B has an offset of 10, meaning that LUNs D10–D17 will be presented to HOST B as LUNs 0–7. Offsets can be used where there are more than eight logical units in the storage array, for example. Alternatively, offsets can be used to selectively present LUNs to different hosts (i.e., where a storage array has LUNs D0–D3 and D10–D13, present D0–D3 to HOST A with OFFSET=0, and present D10–D13 to HOST B with OFFSET=10).

Referring to FIG. 4B, a host mode field 48 is also shown. As an example, the host mode field 48 corresponds to the name of the operating system running on the particular host. This information, in one example, will affect the type of information sent from the array controller to the particular host. For example, if the HOST MODE=VMS, then error log information is sent from the array controller to the host; if the HOST MODE=NT, error log information is not sent to the host. As previously mentioned, the host mode field 48 can be used to indicate the host operating system type, so that various idiosyncratic characteristics of the host can be accounted for within the array controller.

Figure 12:
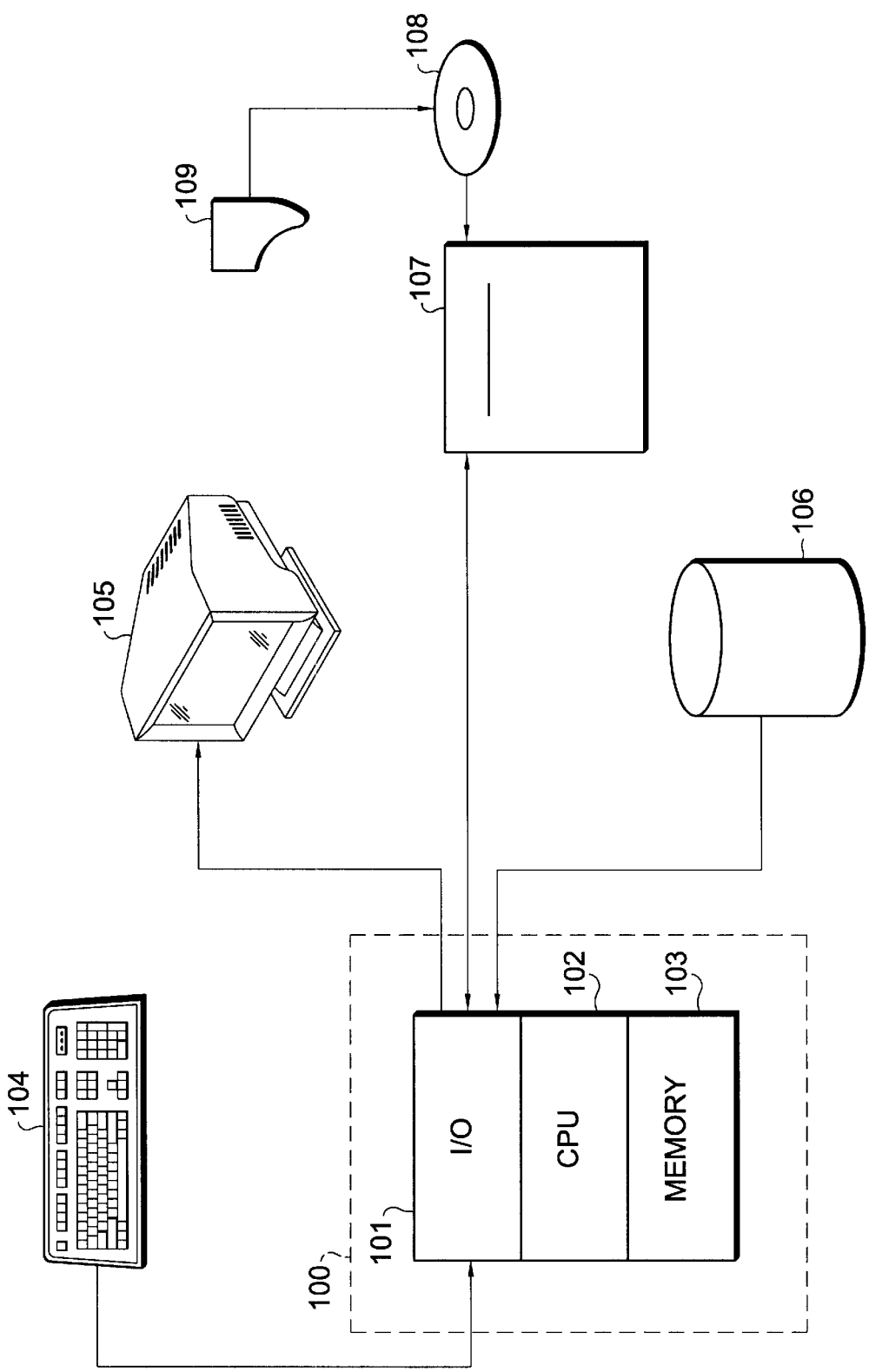
FIG. 12 illustrates a general purpose computing system in which the present invention can be employed.

FIG. 12 illustrates a general purpose computing system (i.e., a host computing system), with which the present invention can be employed. The present invention can be used in computing systems employing Fibre Channel and Parallel SCSI array controllers. Preferably, it is useful at present with Fibre Channel because of the large number of LUNs possible. As future Parallel SCSI implementations or other systems move towards the Fibre Channel model (ANSI SCSI-III), embodiments of the present invention can be employed for allowing selective LUN presentation as described above.

The present invention operates in an environment where each adapter has or provides a unique identifier over the storage interconnect bus. For example, a Fibre Channel interface, or a SCSI III mode interface, or the like, all provide a unique identifier for the adapter over the storage interconnect bus. In one example, the unique identifier of the host is the world-wide identifier provided by the adapter coupled to the host (see FIG. 1)

The operating environment in which the present invention is used encompasses a standalone computing system as well as a general distributed computing system. In the distributed computing system, general purpose computers, workstations, or personal computers are connected via communication links of various types in a client-server arrangement. Programs and data, many in the form of objects, are made available by various members of the system.

Some of the elements of a standalone computer or a general purpose workstation, previously referred to herein as "host computing systems", are shown in FIG. 12, wherein a processor 100 is shown, having an input/output (I/O) section 101, a central processing unit (CPU) 102 and a memory section 103. The I/O section 101 is connected to a keyboard 104, a display unit 105, a disk storage unit 106, and a CD-ROM drive unit 107. The CD-ROM unit 107 can read a CD-ROM medium 108 which typically contains programs 109 and data. Examples of such systems include Compaq's ALPHA System, Compaq's PROLIANT Server, personal computers offered by IBM Corporation and by other manufacturers of IBM compatible personal computers, SPARC Systems, and systems running the UNIX operating system.

Disk storage unit 106 can, in one example, be an array of storage devices/logical units having one or more array controllers. As described above, the present invention permits an array of storage devices to be coupled to one or more host operating systems, while reducing the likelihood that data corruption errors will occur due to a host operating system improperly accessing a logical unit.

While the invention has been particularly shown and described with reference to a preferred embodiment thereof, it will be understood by those skilled in the art that various other changes in the form and details may be made without departing from the spirit and scope of the invention.

We claim:

1. A storage system capable of selectively presenting logical units to two or more host computing systems, the storage system comprising:

one or more persistent storage devices arranged as logical units;

an array controller controlling and coordinating the operations of said persistent storage devices;

a memory accessible by said array controller; and a configuration table stored in said memory, said configuration table containing one or more entries governing one or more interactions between the logical units and the two or more host computing systems, wherein said configuration table contains an access field entry for each logical unit, said access field entry indicating if a particular logical unit can be permitted by the array controller to communicate with a particular one of said host computing systems.

2. The system of claim 1, wherein said configuration table contains an offset field entry for each logical unit, said offset field entry indicating if a particular logical unit should communicate with a particular one of said host computing systems using an internal offset for calculating a logical unit number.

3. The system of claim 1, wherein said configuration table contains a host mode entry for each logical unit, said host mode entry indicating if a particular logical unit should communicate with a particular one of said host computing systems using a predetermined host mode.

4. The system of claim 2, wherein said offset field entry contains a value which permits more than eight logical units to be accessed by two or more host computing systems.

5. The system of claim 3, wherein the host mode entry contains a value indicating the type of operating system running on said particular one of said host computing systems.

6. The system of claim 5, wherein in a first host mode the array controller sends error log information to the host, and in a second host mode the array controller does not send error log information to the host.

7. The system of claim 1, wherein said memory is a non-volatile memory.

8. A method for selectively presenting logical units to two or more host computing systems, the method comprising:

provia one or more persistent storage devices arranged as logical units;

providing an array controller controlling and coordinating the operations of said persistent storage devices;

providing a memory accessible by said array controller; and providing a configuration table stored in said memory, said configuration table containing one or more entries governing one or more interactions between the logical units and the two or more host computing systems, wherein said providing the configuration table includes providing an access field entry for each of the logical units, said access field entry indicating if a particular logical unit can be permitted by the array controller to communicate with a particular one of said host computing systems.

9. The method of claim 8, wherein said step of providing a configuration table further comprises: providing an offset field entry for each logical unit, said offset field entry indicating if a particular logical unit should communicate with a particular one of said host computing systems using an internal offset for calculating a logical unit number.

10. The method of claim 8, wherein said step of providing a configuration table further comprises: providing a host mode entry for each logical unit, said host mode entry indicating if a particular logical unit should communicate with a particular one of said host computing systems using a predetermined host mode.

11. The method of claim 9, wherein said offset field entry contains a value which permits more than eight logical units to be accessed by two or more host computing systems.

12. The method of claim 10, wherein the step of providing the host mode entry comprises: providing a value indicating the type of operating system running on said particular one of said host computing systems.

13. The method of claim 12, further comprising:

determining if said host mode is a first host mode or a second host mode, and upon detecting said first host mode, sending error log information from the array controller to the host, and upon detecting a second host mode, suspending the transmission of error log information from the array controller to the host.

14. A method in a computer system having two or more host devices communicatively linked to a plurality of logical units for controlling access to the logical units, comprising:

receiving a request for access to one of the logical units from one of the host devices;

accessing a configuration table to determine if the one host device is permitted to access the requested one of the logical units;

if access is determined permitted, retrieving from the configuration table a logical unit number offset corresponding to the one host device;

applying the logical unit number offset to the access request to identify the requested one of the logical units; and enabling access between the one host device and the identified one of the logical units.

15. The method of claim 14, further including prior to the receiving:

initially configuring an array controller to perform the request receiving, wherein the array controller is initially configured such that host devices do not have access to the logical units.

16. The method of claim 14, further including prior to the receiving:

sequentially initializing and enabling each of the host devices by obtaining an identifier for each of the host devices and storing the identifiers in the configuration table.

17. The method of claim 16, further including prior to the receiving:

identifying a set of accessible ones the logical units for each of the initialized and enable host devices and storing the set of accessible ones in the configuration table, wherein the accessing is performed by comparing the access request to the stored set of accessible ones for the one host device.

* * * * *